(12) United States Patent
Inaba et al.

(10) Patent No.: US 7,701,620 B2
(45) Date of Patent: *Apr. 20, 2010

(54) IMAGE PICKUP DEVICE AND SIGNAL PROCESSING METHOD

(75) Inventors: Seijiro Inaba, Kanagawa (JP); Kenji Tanaka, Tokyo (JP); Akira Matsui, Kanagawa (JP); Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1323 days.

This patent is subject to a terminal disclaimer.

(21) Appl. No.: 11/172,854

(22) Filed: Jul. 5, 2005

(65) Prior Publication Data

US 2006/0007504 A1 Jan. 12, 2006

(30) Foreign Application Priority Data

Jul. 7, 2004 (JP) ............................ P2004-201014

(51) Int. Cl.
*H04N 1/04* (2006.01)
*G02F 1/1333* (2006.01)

(52) U.S. Cl. ...................................... 358/474; 349/110

(58) Field of Classification Search ................ 358/474, 358/463, 1.15; 349/110, 141, 139, 123, 43, 349/96; 348/308, 294, 224.1, 514, 245, 257, 348/241; 428/304.4, 919; 382/144; 257/440, 257/223, 191, 292; 250/208.1; 345/89, 101, 345/94

See application file for complete search history.

(56) References Cited

U.S. PATENT DOCUMENTS 5,038,369 A 8/1991 Nishiki (Continued)

FOREIGN PATENT DOCUMENTS

EP 1 143 706 10/2001

(Continued)

OTHER PUBLICATIONS

Patent Abstract of Japan, vol. 200, No. 8, Oct. 6, 2000 for JP 2000 152098, published May 30, 2000.

*Primary Examiner*—Saeid Ebrahimi Dehkordy
(74) *Attorney, Agent, or Firm*—Finnegan, Henderson, Farabow, Garrett & Dunner, L.L.P.

(57) ABSTRACT

The present invention provides an image pickup device in which a column noise component is detected in a short time without being influenced under variant random noise even if the VOPB area B includes a small number of lines, and pixel signals from the effective pixel area A are corrected, based on the detected column noise component. The image pickup device includes a solid-state image pickup element having a pixel part including an effective pixel area to be irradiated with light, and a light-shielded pixel area where irradiation of light is shielded, a vertical scanning circuit, a horizontal scanning circuit, and an output circuit, a controller that controls the solid-state image pickup element such that the pixel signals outputted from the pixels arranged in the light-shielded pixel area or the pixel signals outputted from the pixels arranged in the effective pixel area are outputted from the output circuit, a control signal generator that generates a predetermined control signal, a noise component detector that detects noise, and a noise corrector that corrects noise contained in the pixel signals from the effective pixel area based on a noise component detected by the noise component detector, wherein the control signal generator generates different control signals at predetermined timing.

21 Claims, 9 Drawing Sheets

U.S. PATENT DOCUMENTS

| | | |
|---|---|---|
| 6,473,124 B1 | 10/2002 | Panicacci et al. |
| 6,483,541 B1 | 11/2002 | Yonemoto et al. |
| 6,515,285 B1 | 2/2003 | Marshall et al. |
| 2006/0007507 A1* | 1/2006 | Inaba et al. ................. 358/474 |
| 2009/0167997 A1* | 7/2009 | Ohta et al. ................. 349/110 |

FOREIGN PATENT DOCUMENTS

| | | |
|---|---|---|
| JP | 10-126697 | 5/1998 |
| JP | 10-313428 | 11/1998 |

* cited by examiner

IMAGE PICKUP DEVICE AND SIGNAL PROCESSING METHOD

CROSS REFERENCES TO RELATED APPLICATION

The present invention contains subject matter related to Japanese Patent Application JP 2004-201014 filed in the Japanese Patent Office on Jul. 7, 2004, the entire contents of which being incorporated herein by reference.

BACKGROUND OF THE INVENTION

1. Field of the Invention

The present invention relates to an image pickup device which picks up an image of an object by use of an XY address type solid-state image pickup element, and a signal processing method for the image pickup device.

2. Description of the Related Art

Figure 1:
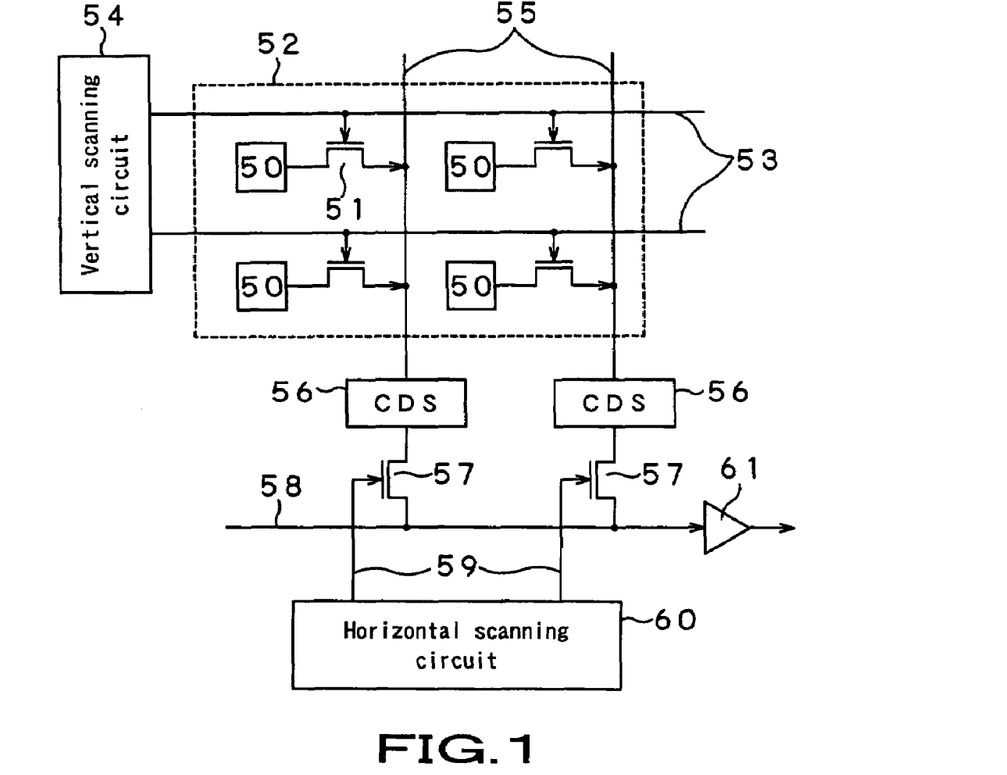
FIG. 1 is a schematic view showing the structure of a solid-state image pickup element.

In a solid-state image pickup element 1 of an XY address type represented by a CMOS (complementary metal oxide semiconductor) sensor, a large number of pixels are arrayed in a matrix of lines and columns, as shown in FIG. 1. The element 1 has a vertical scanning circuit 54 to sequentially select lines of a pixel part 52, a horizontal scanning circuit 60 to sequentially select columns of the pixel part 52, and an output circuit 61 to output signals.

The vertical scanning circuit 54 and the horizontal scanning circuit 60 are constituted by, for example, shift-registers, and generate one vertical scanning pulse and one horizontal scanning pulse for every line and column, respectively.

When reading image signals charged in respective pixels, a pulse signal is added to one vertical selection line 53 by the vertical scanning circuit 54, to electrically conduct all pixel transistors 51 in one line. Image signals are read from respective photosensitive parts 50 onto vertical signal lines 55. The image signals read onto the vertical signal lines 55 are fed to circuits such as a correlative double sampling circuit (CDS) 56 and the like to remove an offset signal for every pixel.

The horizontal scanning circuit 60 adds a pulse signal to transistors 57 connected to the respective vertical signal lines 55 through horizontal selection lines 59, to electrically conduct the transistors 57. Pixel signals from a column from which offset signals have been removed by the CDS 56 are read onto a horizontal signal line 58. The signals are converted into voltage signals by an output circuit 61, and are outputted to the outside.

In an XY address type solid-state image pickup element of this kind, the columns respectively have different (or their own) vertical signal lines 55. Hence, pixel signals fed from the output circuit 61 are offset differently between individual columns if the CDSs 56 and the transistors 57 have characteristic variants. Various offsets which are respectively specific to the columns appear, as stripe-like fixed-pattern noise (hereinafter called column noise) on a display screen, and cause deterioration in image quality.

There has been a method for preventing this deterioration. In the method, only the column noise component is extracted from the solid-state image pickup element, and is maintained as a reference signal for correction. During a normal image pickup operation, the reference signal is subtracted from a signal output from the solid-state image pickup element, to correct column noise.

Figure 2:
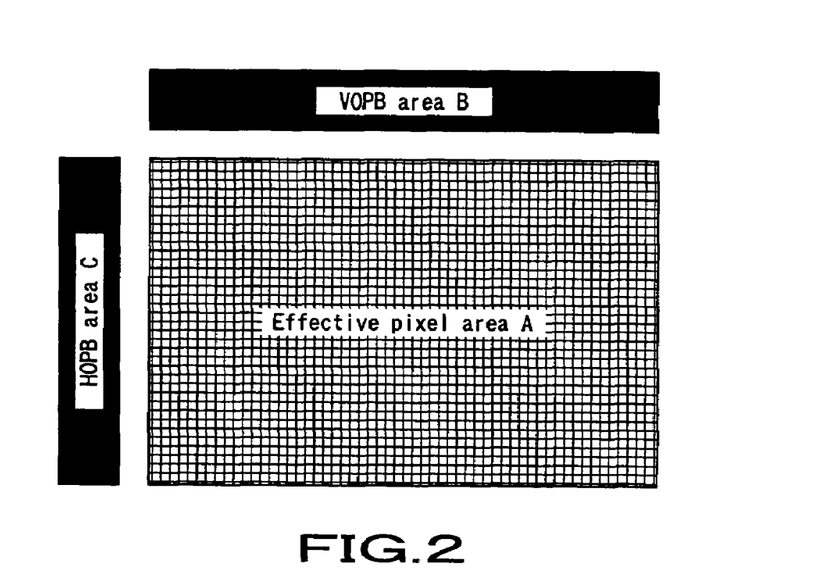
FIG. 2 is a view showing a state where a pixel part of the solid-state image pickup element is constructed by dividing the pixel part into an effective pixel area, a VOPB area, and an HOPB area.

However, when the pixel part 52 is irradiated with light, a signal component based on the incident light is added to the column noise component. Therefore, this output signal cannot be used as a reference signal for correction. Hence, according to Japanese Patent Application Laid-Open Publication No. 10-126697, the pixel part 52 is constituted by an effective pixel area A, a vertical optical black (hereinafter abbreviated as VOPB) area B, and a horizontal optical black (HOPB) area C, as shown in FIG. 2. The effective pixel area A is irradiated with light. In the vertical optical black area B and the horizontal optical black area C, irradiation of light is shielded over several lines to several ten lines by a light-shield plate such as an aluminum thin film, conducting detection and correction of column noise.

Meanwhile, the offset of each column which causes column noise appears in outputs not only from pixels positioned in the effective pixel area A but also from pixels positioned in the VOPB area B as a shielded black level reference. Therefore, correction can be achieved in a manner that column noise components are detected by use of signals from the pixels in the VOPB area B and are subtracted from signals from the pixels from the effective pixel area A.

SUMMARY OF THE INVENTION

However, in case of obtaining a reference signal for correcting column noise by use of signals from the respective pixels in the VOPB area B, there is a significant problem of influence from a dark current component (hereinafter called random noise) which is outputted from each pixel in the VOPB area B and varies. In particular, the VOPB area B covers several lines to several ten lines and so includes a small number of pixels. Therefore, even when an averaging processing is carried out, random noise outputted from each pixel cannot be suppressed sufficiently. In the above-mentioned publication 10-126697, accuracy in detection of column noise is improved by repeatedly performing addition-averaging for plural frames. This method, however, requires a long time to raise the detection accuracy.

Hence, the present invention has been made to provide an image pickup device and a signal processing method thereof in which a column noise component is detected in a short time without being influenced under variant random noise even if the VOPB area B includes a small number of lines, and pixel signals from the effective pixel area A are corrected, based on the detected column noise component.

According to the present invention, an image pickup device comprises: a solid-state image pickup element having a pixel part including pixels uniformly arrayed in a matrix of lines and columns, an effective pixel area to be irradiated with light, and a light-shielded pixel area where irradiation of light is shielded, a vertical scanning circuit that controls control electrodes of pixels arranged in identical one of the lines and connected in common by a vertical selection line, a horizontal scanning circuit that controls control electrodes of vertical signal lines connected in common to main electrodes of pixels arranged in identical one of columns, to sequentially output pixel signals in units of lines to horizontal signal lines, the pixel signals being outputted through the vertical signal lines, and an output circuit that outputs pixel signals from the horizontal signal lines; a controller that controls the solid-state image pickup element such that the pixel signals outputted from the pixels arranged in the light-shielded pixel area or the pixel signals outputted from the pixels arranged in the effective pixel area are outputted from the output circuit; a control signal generator that generates a predetermined control signal; a noise component detector that detects noise contained in the pixel signals from the light-shielded pixel area, which are outputted from the output circuit under control of the controller, based on the control signal generated by the control signal generator; and a noise corrector that corrects noise contained in the pixel signals from the effective pixel area, which are outputted from the output circuit under control of the controller, based on a noise component detected by the noise component detector, and the control signal generator generates different control signals at predetermined timing.

According to the present invention, a signal processing method for an image pickup device comprising a solid-state image pickup element having a pixel part including pixels uniformly arrayed in a matrix of lines and columns, an effective pixel area to be irradiated with light, and a light-shielded pixel area where irradiation of light is shielded, a vertical scanning circuit that controls control electrodes of pixels arranged in identical one of the lines and connected in common by a vertical selection line, a horizontal scanning circuit that controls control electrodes of vertical signal lines connected in common to main electrodes of pixels arranged in identical one of columns, to sequentially output pixel signals in units of lines to horizontal signal lines, the pixel signals being outputted through the vertical signal lines, and an output circuit that outputs pixel signals from the horizontal signal lines, the method comprises: a control signal generation step of generating a predetermined control signal; a noise component detection step of detecting noise contained in the pixel signals from the light-shielded pixel area, which are outputted from the output circuit under predetermined control, based on the control signal generated in the control signal generation step; and a noise correction step of correcting noise contained in the pixel signals from the effective pixel area, which are outputted from the output circuit under predetermined control, based on a noise component detected in the noise component detection step, and in the control signal generation step, different control signals are generated at predetermined timing.

In the present invention, influences from random noise are suppressed, and such a combination of feedback coefficients that converges an integrated value to column noise is selected. In addition, a point at which the selected feedback coefficients are switched from each other is calculated, and a column noise component is detected, based on the calculation result. Therefore, a column noise component can be detected with high accuracy in a short time with a small number of lines. Further, with use of this highly accurate column noise component, column noise in pixel signals is corrected. Accordingly, images with high image quality can be provided.

DETAILED DESCRIPTION OF THE PREFERRED EMBODIMENTS

Hereinafter, a description will be made of an image pickup device and a signal processing method according to an embodiment of the present invention.

Figure 3:
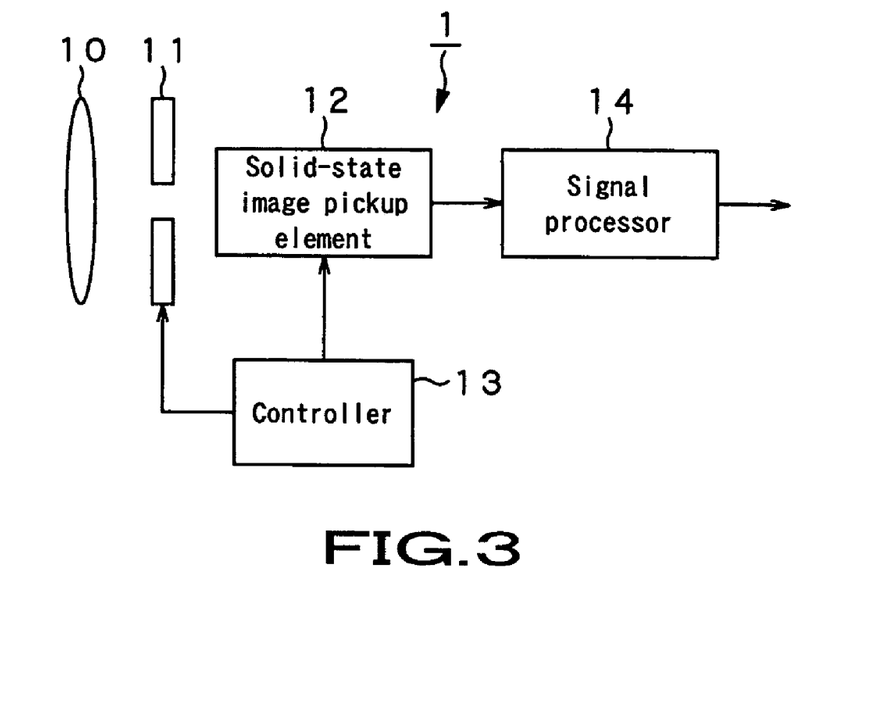
FIG. 3 is a block diagram showing the structure of the image pickup device according to the present invention.

As shown in FIG. 3, an image pickup device 1 has: a lens 10 which converges incident light; a shutter 11 which allows light converged by the lens 10 to pass within the predetermined period of time; a solid-state image pickup element 12 which picks up an image of an object which enters as light through the lens 10 and the shutter 11; a controller 13 which controls the shutter 11 and the solid-state image pickup element 12; and a signal processor 14 which performs a predetermined signal processing on a pixel signal picked up by the solid-state image pickup element 12.

Figure 4:
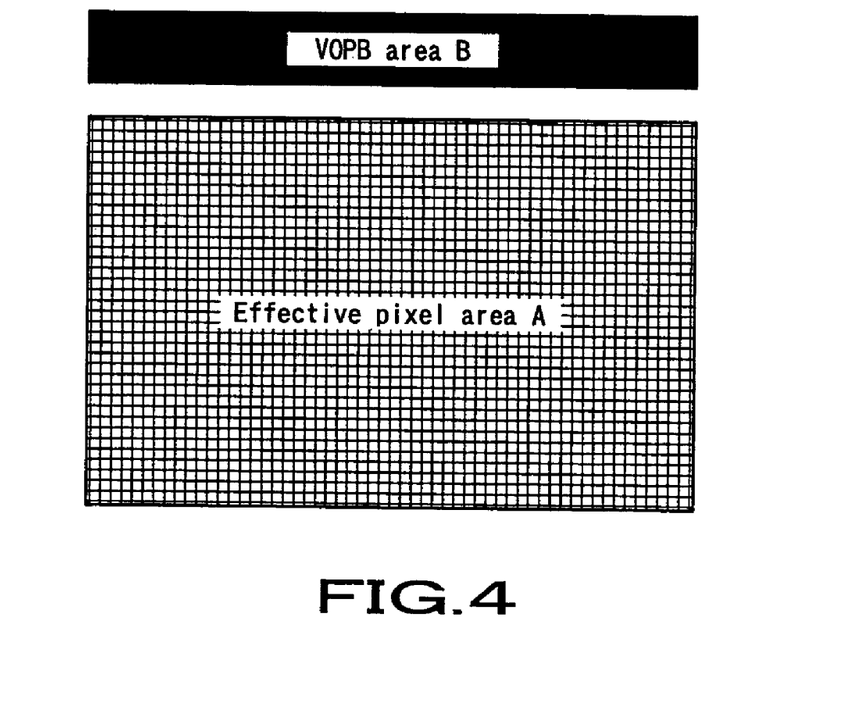
FIG. 4 is a view showing a state where a pixel part of a solid-state image pickup element is constructed by dividing the pixel part into an effective pixel area and a VOPB area.

Light emitted from the object enters into the solid-state image pickup element 12 through an optical system including the lens 10 and the shutter 11. The solid-state image pickup element 12 has a pixel part which picks up an image of the object. As shown in FIG. 4, the pixel part is constituted by an effective pixel area A irradiated with light, and a vertical optical black (hereinafter called VOPB) area B where irradiation of light is shielded over several lines to several ten lines by a light-shield plate such as an aluminum thin film or the like.

The controller 13 controls opening/closing of the shutter 11. The controller 13 controls the solid-state image pickup element 12, to make a signal processing part 14 output a pixel signal S1 selectively outputted from pixels arranged in the effective pixel area A and VOPB area B.

Figure 5:
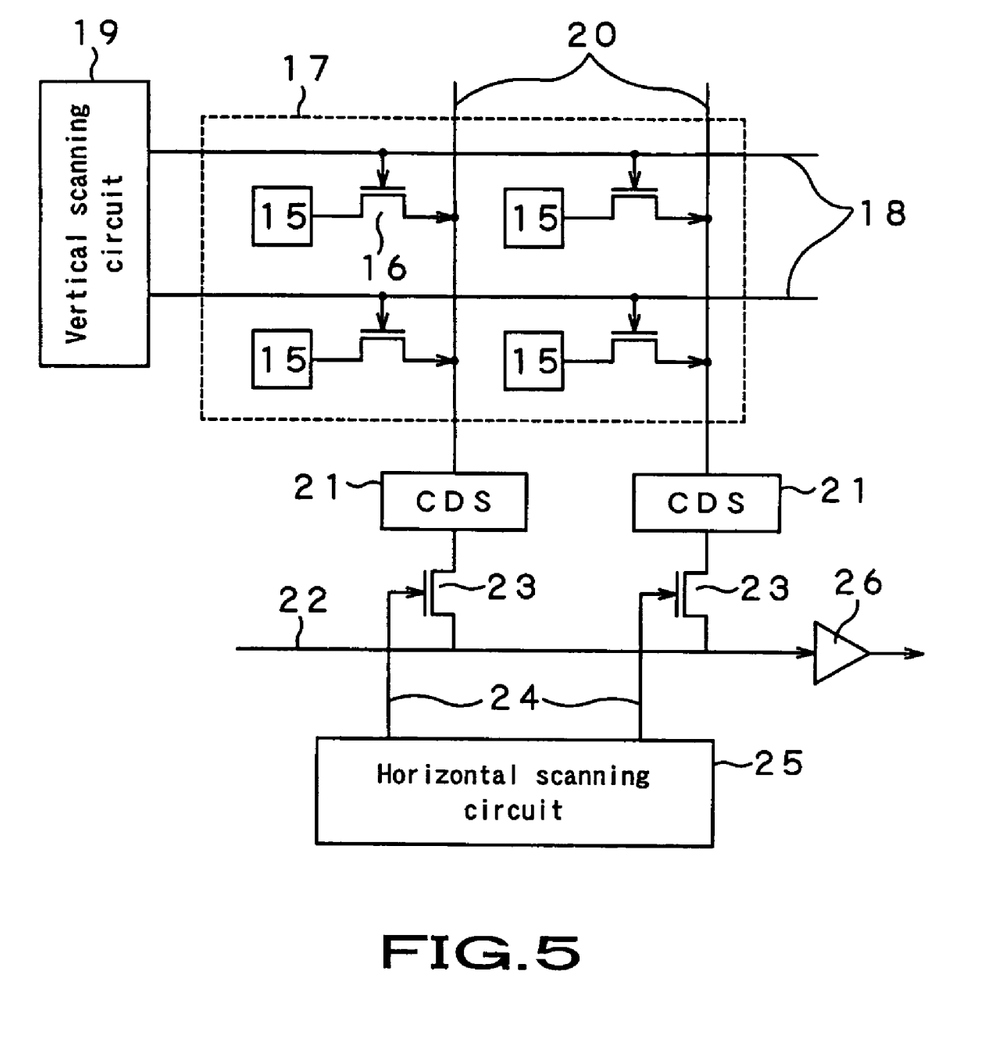
FIG. 5 is a schematic view showing the structure of the solid-state image pickup element.

The solid-state image pickup element 12 will now be described with reference to FIG. 5. The solid-state image pickup element 12 has: photosensitive parts 15 of, for example, an XY address type which store electric charges in accordance with irradiation of light, as shown in FIG. 5; a pixel part 17 constituted by pixel transistors 16 which output electric charges stored in the photosensitive part 15 and are arranged in a matrix of lines and columns; a vertical scanning circuit 19 which applies a pulse signal to vertical selection lines 18 each connecting pixels arranged in every one of lines of the matrix of the pixel part 17; a vertical scanning circuit 19 which applies a pulse signal to vertical selection lines 18 each connecting pixels arranged in one of lines of the matrix; correlative double sampling circuits (CDSs) 21 which remove offset signals from signals fed to vertical signal lines 20 by applying a pulse signal from the vertical scanning circuit 19, the vertical signal lines 20 each connecting pixels arranged in one of columns of the matrix of the pixel part 17; transistors 23 for feeding, to horizontal signal lines 22, signal from which offset signals have been removed by the CDSs 21; a horizontal scanning circuit 25 which supplies the transistors 23 with a pulse signal through horizontal selection lines 24, to feed the signals from which offset signals have been removed by the CDSs 21, to the horizontal signal lines 22; and an output circuit 26 which supplies the signal processor 14 with the signals fed to the horizontal scanning circuit 25.

In the solid-state image pickup element 12 of the XY-address type, the vertical signal lines 20 are different from each other between columns of pixels arrayed. Therefore, the image signal outputted from the output circuit 26 is influenced by offsets which vary between the columns if there is a characteristic variant between the CDSs 21 or the transistors 23. The offset for every column appears as stripe-like fixed pattern noise (hereinafter called column noise) on the display screen. This is a factor which causes deterioration in image quality. The signal processor 14 in the rear stage of the solid-state image pickup element 12 removes column noise of this kind.

Figure 6:
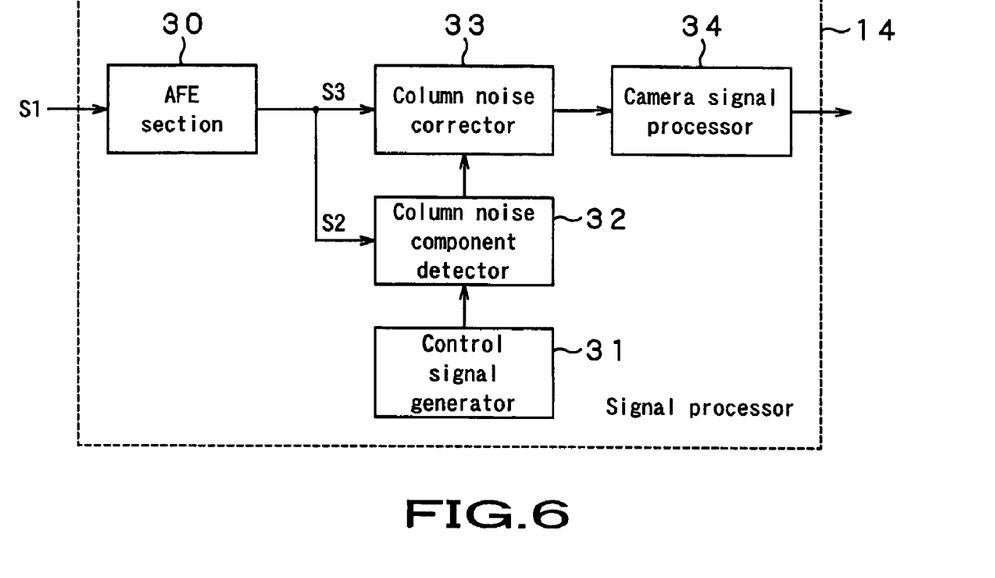
FIG. 6 is a block diagram showing the structure of a signal processor.

Next, the structure of the signal processor 14 will be described below. As shown in FIG. 6, the signal processor 14 has: an AFE (analog front end) section 30 which converts an output signal of the solid-state image pickup element 12 into a digital signal; a control signal generator 31 which generates a predetermined control signal; a column noise component detector 32 which detects fixed pattern noise (hereinafter called a column noise component) in pixel signals supplied from the AFE section 30, based on the control signal generated by the control signal generator 31; a column noise corrector 33 which corrects a column noise component from the pixel signals supplied from the AFE section 30, based on the column noise component detected by the column noise component detector 32; and a camera signal processor 34 which performs a predetermined camera processing on the output signal from the column noise corrector 33.

The AFE section 30 converts a pixel signal S1 supplied from the solid-state image pickup element 12 into a digital signal, and outputs the converted pixel signal. Also, the AFE section 30 supplies a column noise component detector 32 with a signal for column noise detection, which is a signal S2 outputted from pixels arranged in the VOPB area B. The AFE section 30 then supplies a column noise corrector 33 with a signal S3 outputted from pixels arranged in the effective pixel area A.

The control signal generator 31 generates a predetermined control signal, and outputs the generated control signal to the column noise component detector 32.

Focusing attention on the amount of column noise which is uniform with respect to pixels within each column, the column noise component detector 32 detects column noise components from the signal S2 supplied from the AFE section 30, based on control signals supplied from the control signal generator 31. The column noise component detector 32 stores the detection results into a line memory 42.

Figure 7:
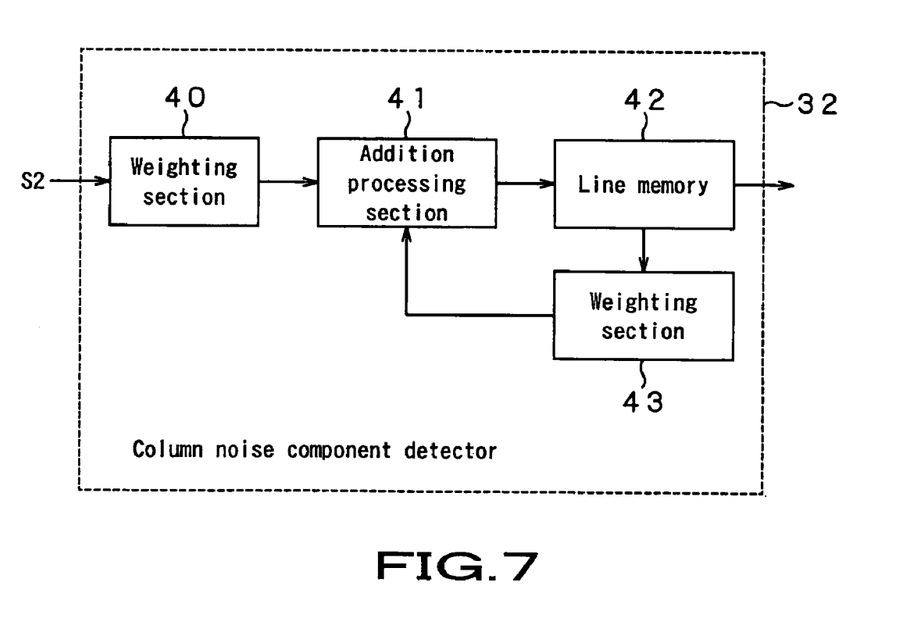
FIG. 7 is a block diagram showing the structure of a column noise component detector.

The structure of the column noise component detector 32 will now be described with reference to FIG. 7. As shown in FIG. 7, the column noise component detector 32 has: a weighting section 40 which weights the signal S2 fed from the AFE section 30, with a predetermined coefficient k1 ; an addition processor 41 which performs an addition processing on an output signal from the weighting section 40 and a feedback signal; a line memory 42 which stores the signal subjected to the addition processing by the addition processor 41; and a weighting section 43 which reads the signal stored in the line memory 42 and subjected to a past addition processing, and weights the read signal with a feedback coefficient k2. The column noise component detector 32 thus constitutes a feedback group. The predetermined coefficient k1 is generated, based on a control signal fed from the control signal generator 31, and is expressed, for example, as follows.

$$k1=1/2^n$$

The feedback coefficient is generated by a coefficient generator not shown, based on a control signal fed from the control signal generator 31, and is expressed, for example, as follows.

$$k2=1-1/2^n$$

The column noise component detector 32 is constituted by an integrator of a IIR (infinite impulse response) filter. As the value of the feedback coefficient k2 varies, the speed of convergence to the column noise amount and variants of integration results caused by random noise vary. The optimum value of the feedback coefficient k2 depends on the column noise amount, the random noise amount, and the number of integration samples (i.e., the number of lines in the VOPB area B). If the number of integration samples is limited, stripe-like fixed pattern noise (column noise) which cannot be sufficiently suppressed with one single feedback coefficient can be detected accurately and corrected, in particular, by dynamically changing the feedback coefficient k2.

Figure 8:
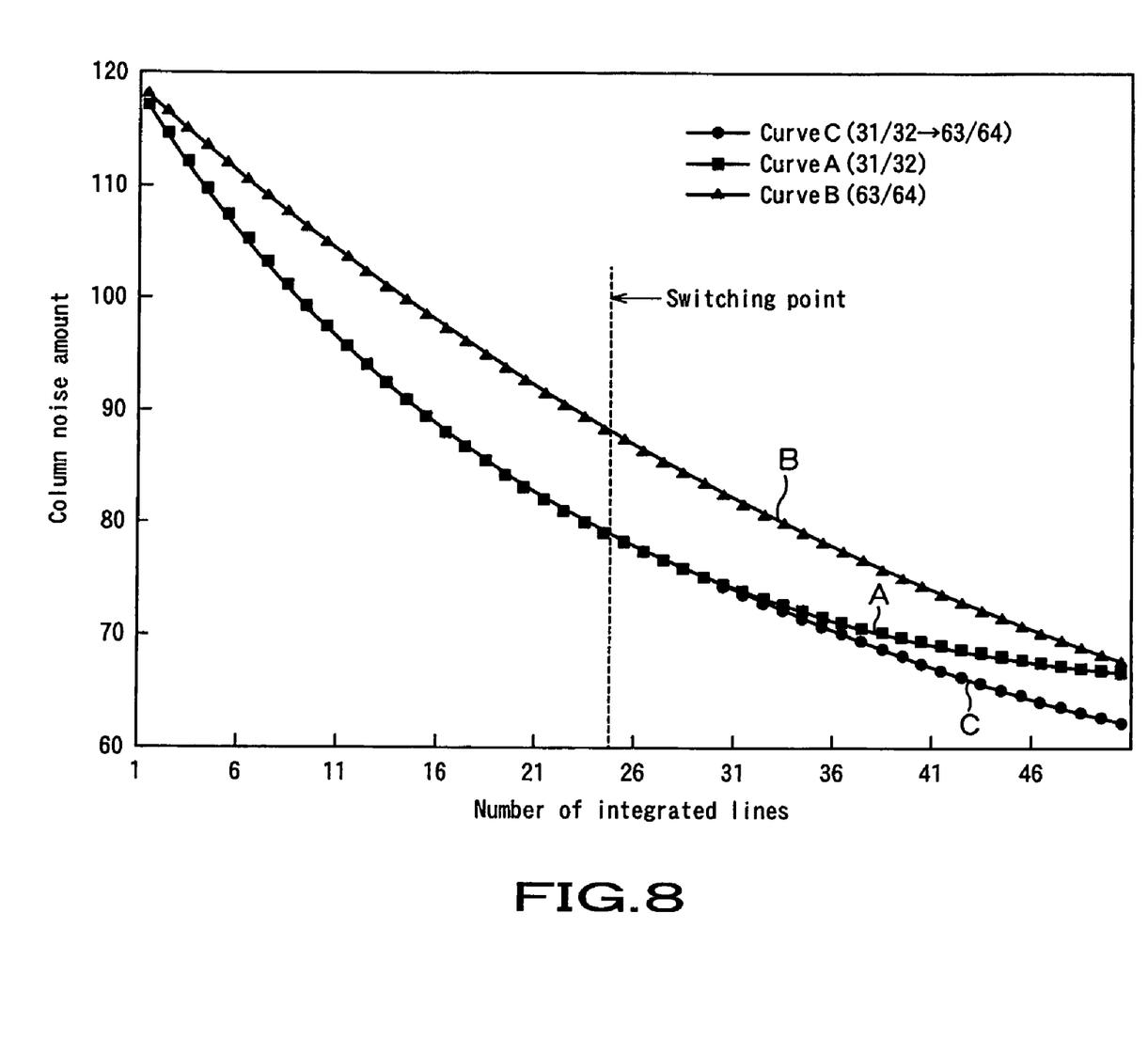
FIG. 8 is a graph showing column noise characteristics with respect to the number of integration lines used when calculating a switching point of feedback coefficients.

With reference to FIG. 8, a description will now be made of an example in which column noise can be suppressed much more by changing the feedback coefficient k2 than by using one single feedback coefficient. FIG. 8 is a graph showing effects of integration obtained by numerical calculations where a VOPB area B of 50 lines exists on a sensor, and random noise and column noise each have a particular noise amount. The horizontal axis represents the number of integration lines, and the vertical axis represents the size of column noise component remaining not corrected. The curve A shows results where the feedback coefficient k2 is expressed as follows.

$$k2=1-1/2^5=31/32$$

The curve B shows results where the feedback coefficient k2 is expressed as follows.

$$k2=1-1/2^6=63/64$$

The curve C shows results where the feedback coefficient k2 is changed, i.e., the feedback coefficient k2 is $31/32$ (n=5) from 0 to 25 lines and is $63/64$ (n=6) beyond 25 lines (26 to 50 lines).

The smaller the value on the vertical axis was, the more column noise could be corrected.

Hence, taken into consideration the column noise amount on the fiftieth line, "67" is given from the curve B. "66" is given from the curve A, and "62" is given from the curve C. It is thus apparent that column noise can effectively be corrected when the feedback coefficient k2 is switched, at a boundary of a suitable number of lines.

The optimum number of lines at the point where the coefficient should be switched is determined, depending on a predetermined calculation. This calculation may be carried out at the time of adjustment in a factory or at the time of turning on the power. The flow of the calculation will now be described in accordance with a flowchart shown in FIG. 9.

Figure 9:
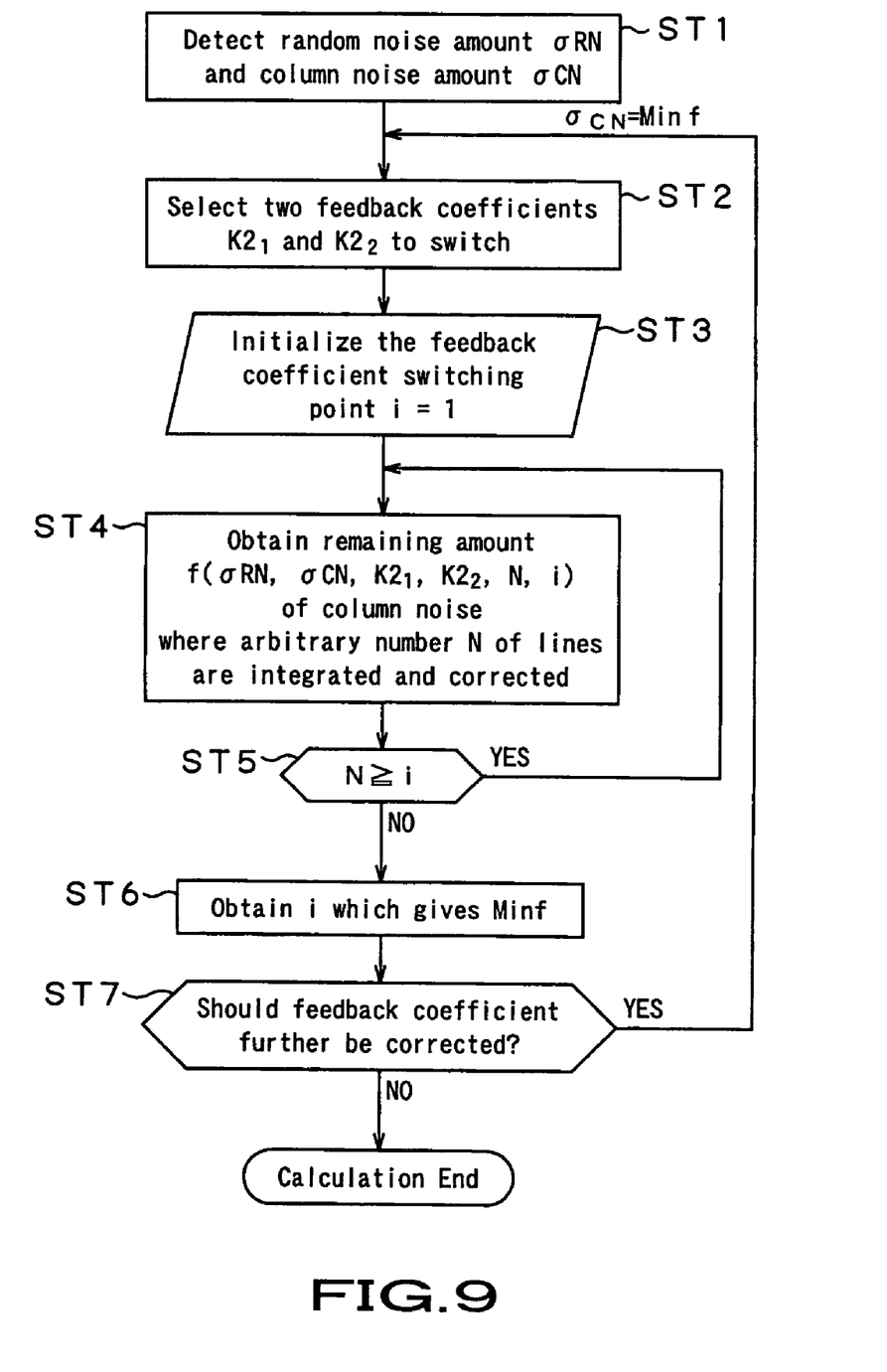
FIG. 9 is a flowchart showing a procedure of calculating the switching point.

The random noise amount (standard deviation) and the column noise amount (standard deviation) of the solid-state image pickup element 12 are obtained by a predetermined method (step ST1). Based on the random noise amount and column noise amount obtained, two values are selected for the feedback coefficient k2 (step ST2). The selected feedback coefficients k2 is let transit from the smaller one to the other greater one.

Next, initialization is carried out such that the line i at which the feedback coefficient k2 is switched is set to 1 (step ST3). Integration is carried out up to an arbitrary line number N, and the remaining column noise amount is calculated when column noise correction is carried out (step ST4). Also the remaining column noise amount f can be expressed as functions of the random noise amount $\sigma_{RN}$, column noise amount $\sigma_{CN}$, feedback coefficient k2, integration line number N, and switching point i. Next, whether the switching point i has reached the integration line number N or not is determined. If the integration line number has been reached, the flow goes to step ST6. Otherwise, if not, the switching point i is increased by 1 and the flow returns to step ST4.

N remaining amounts f column noise obtained in step ST4 are compared with each other, to search for the switching point i at which the remaining amount f of column noise is minimized (step ST6). Also, whether the feedback coefficient k2 should further be changed to another feedback coefficient k2 or not is determined (step ST7). If the feedback coefficient k2 should be changed, the remaining amount f of column noise at the optimum switching point is set as a column noise amount of the pixel signal, and steps ST2 to ST7 are repeated.

The control signal generator 31 generates a control signal, based on the switching point i obtained as described above, and supplies the column noise component detector 32 with the control signal. Further, the column noise component detector 32 switches the feedback coefficient, based on the control signal, and detects the noise component of the pixel signal S2 supplied from the AFE section 30.

Based on the noise component detected by the column noise component detector 32, the column noise corrector 33 corrects the column noise of the signal S3 supplied from the AFE section 30 and outputted from the pixels arranged in the effective pixel area A. The column noise corrector 33 then supplies the camera signal processing section 34 with the corrected signal. The camera signal processing section 34 performs a predetermined camera signal processing on the signal whose column noise has been subjected to the correction processing by the column noise corrector 33.

There is a case that the number of lines in the VOPB area B is so small that the column noise cannot be sufficiently corrected if the feedback coefficient k2 is changed dynamically. An example of a method for detecting a column noise component in this case will be described below.

The controller 13 controls the shutter 11 only for one frame when turning on or switching the power, and shields the effective pixel area A by inserting the mechanical shutter. Since the effective pixel area A is shielded, the signal outputted from the pixels arranged in the effective pixel area A can be used as a signal for detecting the column noise component, like pixels in the VOPB area B.

Figure 10:
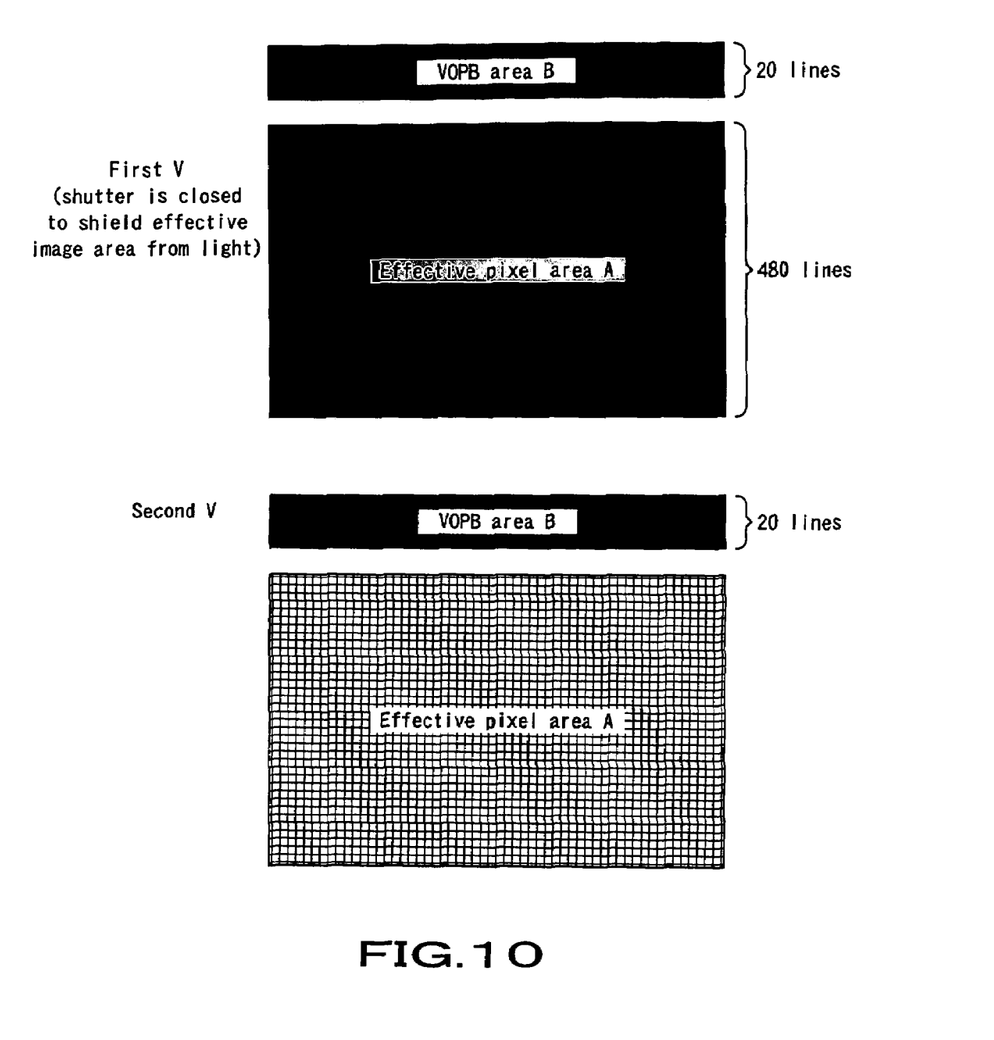
FIG. 10 is a view for explaining a case where an effective pixel area is used for column noise component detection.

For example, as shown in FIG. 10, where pixels of 720×20 (columns×lines) are arranged in the VOPB area B and pixels of 720×480 (columns×lines) are arranged in the effective pixel area A, the column noise component detector 32 can use a signal equivalent to 20+480+20=520 lines, summing up two frames (2V), for detection of a column noise component.

Incidentally, a processing time becomes long as the reading of signals from the solid-state image pickup element 12 is performed for two frames. However, since the number of lines used for column noise detection increases, it is possible to detect a column noise component with high accuracy.

There is another case of including no mechanical shutter or case of requiring a number of integration lines equivalent to one frame. An example of a method for accurately detecting a column noise component will be described below.

Figure 11:
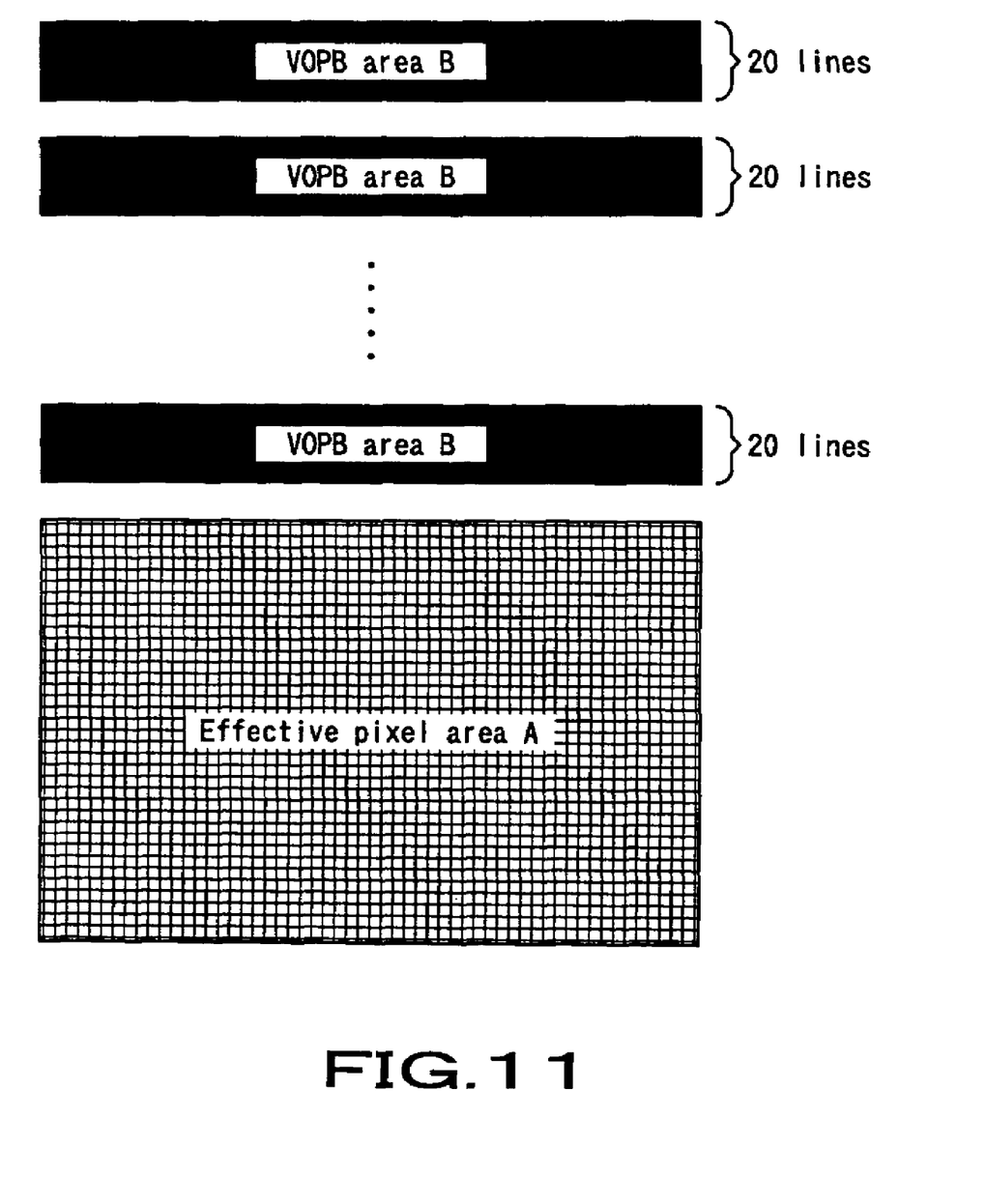
FIG. 11 is a view for explaining a case where a VOPB area is read, plural times, to perform column noise component detection.

The controller 13, as shown in FIG. 11, controls the solid-state image pickup element 12, to read only the VOPB area B plural times. By reading the VOPB area B plural times, the number of integration lines can be increased so that a number of lines capable of sufficiently correcting the column noise component can be obtained. Accordingly, it is possible to obtain a number of lines enough to correct the column noise component, within a time shorter than required to read a signal for one frame.

Note that, the image pickup device 1 need not always adopt a structure as follows. That is, the image pickup device 1 reads signals for column noise detection and detects a column noise component. Thereafter, the image pickup device 1 reads an image signal expressing an object, from the solid-state image pickup element 12. Based on the column noise component, the column noise of the image signal expressing the object is corrected, based on the column noise component. The structure may be arranged as follows. That is, the image pickup device 1 reads an image signal expressing an object from the solid-state image pickup element 12, and stores the image signal expressing the object into a predetermined memory. The image pickup device 1 reads signals for column noise detection and detects the column noise component. Based on the column noise component, column noise in the image signal expressing the object and stored in the memory is corrected, based on the column noise component.

In addition, if the operation mode is not changed, the column noise component detector 32 reads a past integration result detected in the same operation mode, and performs integration for plural frames or plural fields. Since the column noise component detector 32 uses images of plural frames, the number of lines used for integration increases. Therefore, it is possible to converge to the value of the column noise, while suppressing the random noise caused by a dark current. As a result, column noise detection can be performed more accurately.

The size of the column noise component does not change when the method for reading a signal from the solid-state image pickup element 12 does not change at all even in case where the operation mode changes. Therefore, the column noise component detector 32 can raise detection accuracy by continuously performing integration, like in the case where the operation mode does not change.

A further description will now be made below with respect to operation of the column noise component detector 32 when the method for reading a signal from the solid-state image pickup element 12 changes in case the operation mode changes.

If pixel addition or the like is carried out on the solid-state image pickup element 12, the change amount of the column noise component differs between when pixel addition is carried out before column noise is generated, e.g., before signals are inputted to the CDS 21, and when pixel addition is carried out after column noise is generated, e.g., after signals are outputted from the CDSs 21.

Further, the change amount of the column noise component differs depending on whether the method for adding signals outputted from pixels arranged in the pixel part 17 is a vertical addition method or a horizontal addition method.

However, in any of the vertical addition method and the horizontal addition method, there is a case that the change amount of the column noise component can be physically known due to the structure of the solid-state image pickup element 12. In this case, for example, a processing of weighting a column noise component detected in the past with a predetermined coefficient is carried out. Integration is carried out with use of the value, so that the column noise component can be detected and corrected effectively.

Detection of a column noise component and correction of column noise will now be described below in case where a vertical addition method is adopted as a method for adding signals outputted from the pixels arranged in the pixel part 17.

The solid-state image pickup element 12 reads signals in an interlaced scanning method based on pixel addition between odd and even lines, in a motion picture mode or in a monitoring mode. In a still image mode, signals are read from odd and even lines in a progressive (non-interlaced scanning) method without performing pixel addition. Alternatively, detection of a column noise component is carried out in the monitoring mode. Correction of column noise is carried out in the still image mode. Also, the solid-state image pickup element 12 has a structure in which the column noise component does not change, regardless of whether the addition method is a vertical or horizontal addition method.

If the vertical addition method is adopted, the signal amount required for correction of column noise by the column noise corrector 33 is nearly half of the signal amount required for detection of a column noise component by the column noise component detector 32, because pixels are not added.

Hence, in order to equalize the signal amounts required for detection of a column noise component and correction of column noise, a gain of doubling may be applied in the side of the solid-state image pickup element 12. By thus applying a gain, the signal amount from an object is equalized to the same amount as that in the motion picture mode. On the other side, the column noise component is doubled. Therefore, in the motion picture mode and the monitoring mode, detection is performed by the interlaced scanning method, and the column noise amount stored in the line memory is applied with a gain of doubling, to match the column noise amount when a processing is performed in the progressive method in the still image mode. The doubled column noise amount is used for the detection of a column noise component and correction of column noise.

Next, detection of a column noise component and correction of column noise will be described below in case where a horizontal addition method is adopted as a method of adding a signal outputted from pixels arranged in the pixel part 17.

Figure 12A:
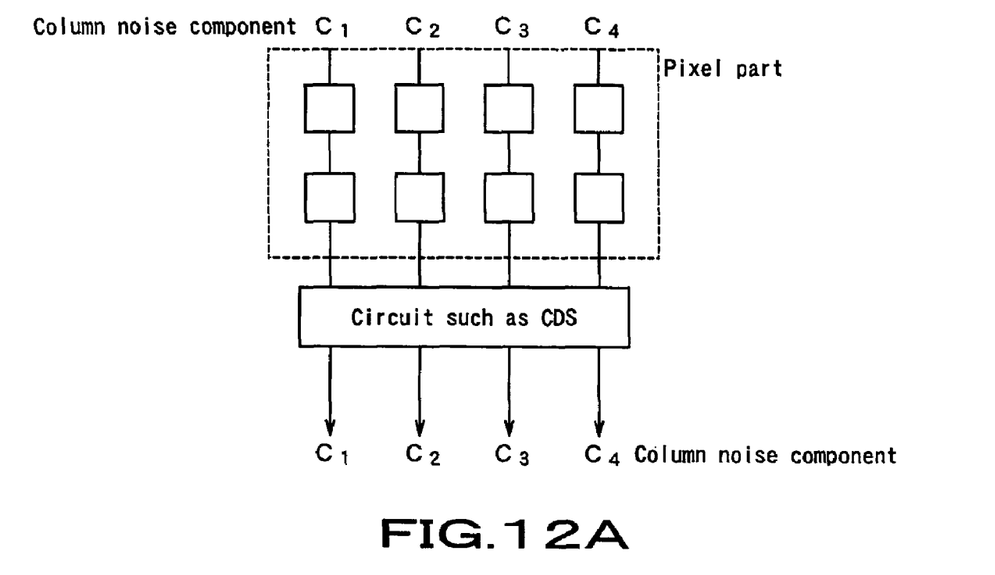
FIGS. 12A and 12B are views used for operations of the solid-state image pickup element in a still image mode and in a monitoring mode.
Figure 12B:
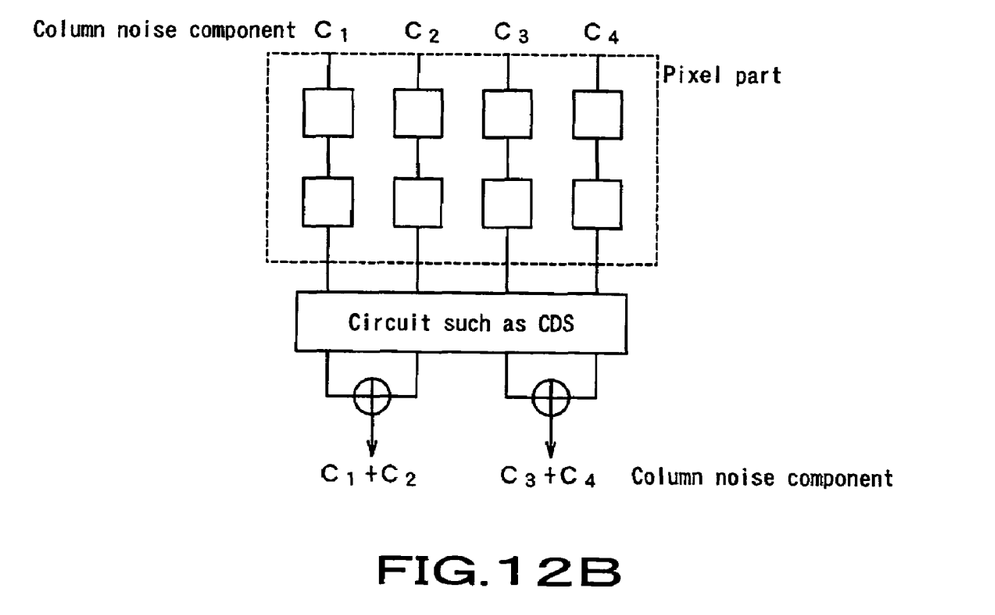

As shown in FIG. 12, in the still image mode, the solid-state image pickup element 12 reads signals in the progressive method, without performing pixel addition. In the monitoring mode, the solid-state image pickup element 12 adopts a method of reading signals by horizontal addition of adjacent two pixels. Detection of a column noise component is carried out, in the still image mode, by the column noise component detector 32. Correction of column noise is carried out, in the monitoring mode, by the column noise corrector 33.

If the vertical addition method is adopted, the signal amount required for correction of column noise by the column noise component detector 32 is nearly twice the signal amount required for detection of a column noise component by the column noise component detector 32, because pixels are added. However, the column noise component is simply a sum of two pixels, according to pixel addition on the sensor.

As shown in FIG. 12A, in the still image mode, the column noise component detector 32 has already detected column noise components of all columns in the solid-state image pickup element 12. Therefore, when a column noise component which varies is obtained by the horizontal two-pixel addition, the detection result may be used as shown in FIG. 12B.

Therefore, in the monitoring mode, a column noise component detected in the still image mode is added for every column subjected to the horizontal addition. The value is used to perform integration, and is also used for detection of a column noise component and correction of column noise.

As will be naturally understood, there is a case that the column noise component does not vary even when the method of reading signals from the solid-state image pickup element 12 is changed, because addition is carried out in an area before occurrence of column noise. In this case, detection accuracy can be raised by continuously carrying out integration, like in the case where the operation mode does not change.

Thus, the image pickup device 1 according to the present invention has: a control signal generator 31 which generates a predetermined control signal; a column noise component detector 32 which detects a column noise component from signals outputted from pixels arrayed in a VOPB area B arranged in a pixel part 17, based on the control signal generated by the control signal generator 31; a column noise corrector 33 which corrects column noise in signals outputted from pixels arrayed in an effective pixel area A of the pixel part 17, based on the column noise component detected by the column noise component detector 32. The column noise component detector 32 selects such a combination of feedback coefficients k2 that converges an integrated value to the column noise without being influenced by random noise. In addition, the column noise component detector 32 calculates a point at which the selected feedback coefficients k2 are switched to each other, and the column noise component is detected, based on the calculation result. Therefore, a column noise component can be detected with high accuracy in a short time with a small number of lines. Further, with use of this highly accurate column noise component, column noise of pixel signals is corrected. Accordingly, images with high image quality can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device comprising:
   a solid-state image pickup element having
      a pixel part including pixels uniformly arrayed in a matrix of lines and columns, an effective pixel area to be irradiated with light, and a light-shielded pixel area where irradiation of light is shielded,
      a vertical scanning circuit that controls control electrodes of pixels arranged in identical one of the lines and connected in common by a vertical selection line,
      a horizontal scanning circuit that controls control electrodes of vertical signal lines connected in common to main electrodes of pixels arranged in identical one of columns, to sequentially output pixel signals in units of lines to horizontal signal lines, the pixel signals being outputted through the vertical signal lines, and
      an output circuit that outputs pixel signals from the horizontal signal lines;
   control means for controlling the solid-state image pickup element such that the pixel signals outputted from the pixels arranged in the light-shielded pixel area or the pixel signals outputted from the pixels arranged in the effective pixel area are outputted from the output circuit;
   control signal generating means for generating a predetermined control signal;
   noise component detecting means for detecting noise contained in the pixel signals from the light-shielded pixel area, that are outputted from the output circuit under control of the control means, based on the control signal generated by the control signal generating means; and
   noise correcting means for correcting noise contained in the pixel signals from the effective pixel area, which are outputted from the output circuit under control of the control means, based on a noise component detected by the noise component detecting means, wherein the control signal generating means generates different control signals at predetermined timing.

2. The image pickup device according to claim 1, wherein the noise component detecting means includes:

coefficient generating means for generating a predetermined coefficient and a feedback coefficient, based on the control signals supplied from the control signal generating means;

first weighting means for weighting the pixel signals from the light-shielded pixel area, which are outputted from the output circuit, with the predetermined coefficient generated by the coefficient generating means;

addition processing means for performing an addition processing of adding together an output signal from the first weighting means and a feedback signal;

storage means for storing a signal obtained through the addition processing by the addition processing means; and second weighting means for weighting the signal stored in the storage means with the feedback coefficient generated by the coefficient generating means, and the addition processing means performs an addition processing of adding together the output signal from the first weighting means and an output signal from the second weighting means, to calculate a noise component contained in the pixel signals from the light-shielded pixel area.

3. The image pickup device according to claim 2, wherein the storage means stores a calculated noise component for plural frames or plural fields.

4. The image pickup device according to claim 1, wherein the control means controls the solid-state image pickup element, to let the output circuit output, plural times, only those pixel signals that are outputted from the pixels arranged in the light-shielded pixel area, and the noise component detecting means detects a noise component contained in the pixel signals from the light-shielded pixel area, which have been outputted plural times.

5. The image pickup device according to claim 1, wherein the control means controls the solid-state image pickup element, shields the effective pixel area from light, and lets the output circuit output the pixel signals outputted from the pixels arranged in the shielded effective pixel area, and the noise component detecting means detects a noise component contained in the pixel signals from the light-shielded pixel area and the effective pixel area.

6. The image pickup device according to claim 1, wherein the control signal generating means is capable of storing in advance the timing at which the control signal generating means generates the different control signals.

7. The image pickup device according to claim 1, wherein the noise component detecting means detects a noise component contained in the pixel signals from the light-shielded pixel area, which are outputted from the output circuit, prior to detection of a noise component contained in the pixel signals from the effective pixel area.

8. The image pickup device according to claim 1, wherein the noise component detecting means detects a noise component contained in the pixel signals from the light-shielded pixel area, which are outputted from the output circuit, after detection of a noise component contained in the pixel signals from the effective pixel area.

9. The image pickup device according to claim 1, wherein the solid-state image pickup element has a first operation mode of performing interlaced reading in which pixels in adjacent lines in the pixel part are added to each other, and a second operation mode of performing progressive reading in which pixels are not added, and based on a second noise component calculated by multiplying the noise component detected in the first operation mode by a gain of double, the noise component detecting means detects noise contained in the pixel signals from the effective pixel area in the second operation mode.

10. The image pickup device according to claim 1, wherein the solid-state image pickup element has a first operation mode of performing interlaced reading in which pixels in adjacent columns in the pixel part are added to each other, and a second operation mode of performing progressive reading in which pixels are not added, and based on a second noise component calculated by adding those noise components to each other that are of the adjacent columns among noise components detected in the second operation mode, the noise component detecting means detects noise contained in the pixel signals from the effective pixel area in the first operation mode.

11. A signal processing method for an image pickup device comprising a solid-state image pickup element having a pixel part including pixels uniformly arrayed in a matrix of lines and columns, an effective pixel area to be irradiated with light, and a light-shielded pixel area where irradiation of light is shielded, a vertical scanning circuit that controls control electrodes of pixels arranged in identical one of the lines and connected in common by a vertical selection line, a horizontal scanning circuit that controls control electrodes of vertical signal lines connected in common to main electrodes of pixels arranged in identical one of columns, to sequentially output pixel signals in units of lines to horizontal signal lines, the pixel signals being outputted through the vertical signal lines, and an output circuit that outputs pixel signals from the horizontal signal lines, the method comprising:

a control signal generation step of generating a predetermined control signal, a noise component detection step of detecting noise contained in the pixel signals from the light-shielded pixel area, which are outputted from the output circuit under predetermined control, based on the control signal generated in the control signal generation step; and a noise correction step of correcting noise contained in the pixel signals from the effective pixel area, which are outputted from the output circuit under predetermined control, based on a noise component detected in the noise component detection step, wherein in the control signal generation step, different control signals are generated at predetermined timing.

12. The signal processing method according to claim 11, wherein the noise component detection step includes:

a coefficient generation step of generating a predetermined coefficient and a feedback coefficient, based on the control signals generated in the control signal generation step;

a first weighting step of weighting the pixel signals from the light-shielded pixel area, which are outputted from the output circuit, with the predetermined coefficient generated in the coefficient generation step;

an addition processing step of performing an addition processing of adding together an output signal from the first weighting step and a feedback signal;

a storing step of storing a signal obtained through the addition processing by the addition processing step; and a second weighting step of weighting the signal stored in the storing step, with the feedback coefficient generated in the coefficient generation step, and in the addition processing step, an addition processing of adding together the output signal from the first weighting step and an output signal from the second weighting step is performed to calculate a noise component contained in the pixel signals from the light-shielded pixel area.

13. The signal processing method according to claim 12, wherein a noise component which is calculated in the noise component detection step is stored for plural frames or plural fields.

14. The signal processing method according to claim 11, wherein the output circuit is let output, plural times, only those pixel signals that are outputted from the pixels arranged in the light-shielded pixel area of the solid-state image pickup element, and in the noise component detection step, a noise component contained in the pixel signals from the light-shielded pixel area, which have been outputted plural times, is detected.

15. The signal processing method according to claim 11, wherein the effective pixel area of the solid-state image pickup element is shielded from light, and the output circuit is let output the pixel signals outputted from the pixels arranged in the shielded effective pixel area, and in the noise component detection step, a noise component contained in the pixel signals from the light-shielded pixel area and the effective pixel area is detected.

16. The signal processing method according to claim 11, wherein in the control signal generation step, the timing at which the control signal generation step generates the different control signals is stored in advance.

17. The signal processing method according to claim 11, wherein in the noise component detection step, a noise component contained in the pixel signals from the light-shielded pixel area, which are outputted from the output circuit, prior to detection of a noise component contained in the pixel signals from the effective pixel area is detected.

18. The signal processing method according to claim 11, wherein in the noise component detection step, a noise component contained in the pixel signals from the light-shielded pixel area, which are outputted from the output circuit, after detection of a noise component contained in the pixel signals from the effective pixel area is detected.

19. The signal processing method according to claim 11, wherein the solid-state image pickup element has a first operation mode of performing interlaced reading in which pixels in adjacent lines in the pixel part are added to each other, and a second operation mode of performing progressive reading in which pixels are not added, and based on a second noise component calculated by multiplying the noise component detected in the first operation mode by a gain of double, noise contained in the pixel signals from the effective pixel area in the second operation mode is detected in the noise component detection step.

20. The signal processing method according to claim 11, wherein the solid-state image pickup element has a first operation mode of performing interlaced reading in which pixels in adjacent columns in the pixel part are added to each other, and a second operation mode of performing progressive reading in which pixels are not added, and based on a second noise component calculated by adding those noise components to each other that are of the adjacent columns among noise components detected in the second operation mode, noise contained in the pixel signals from the effective pixel area in the first operation mode is detected in the noise component detection step.

21. An image pickup device comprising:

a solid-state image pickup element having a pixel part including pixels uniformly arrayed in a matrix of lines and columns, an effective pixel area to be irradiated with light, and a light-shielded pixel area where irradiation of light is shielded, a vertical scanning circuit that controls control electrodes of pixels arranged in identical one of the lines and connected in common by a vertical selection line, a horizontal scanning circuit that controls control electrodes of vertical signal lines connected in common to main electrodes of pixels arranged in identical one of columns, to sequentially output pixel signals in units of lines to horizontal signal lines, the pixel signals being outputted through the vertical signal lines, and an output circuit that outputs pixel signals from the horizontal signal lines;

a controller that controls the solid-state image pickup element such that the pixel signals outputted from the pixels arranged in the light-shielded pixel area or the pixel signals outputted from the pixels arranged in the effective pixel area are outputted from the output circuit;

a control signal generator that generates a predetermined control signal;

a noise component detector that detects noise contained in the pixel signals from the light-shielded pixel area, which are outputted from the output circuit under control of the controller, based on the control signal generated by the control signal generator; and a noise corrector that corrects noise contained in the pixel signals from the effective pixel area, which are outputted from the output circuit under control of the controller, based on a noise component detected by the noise component detector, wherein the control signal generator generates different control signals at predetermined timing.

* * * * *